US011215124B2

(12) United States Patent
Van Den Ende et al.

(10) Patent No.: US 11,215,124 B2
(45) Date of Patent: Jan. 4, 2022

(54) SYSTEM AND METHOD FOR CONDITIONING A FLUID USING BLEED AIR FROM A BYPASS DUCT OF A TURBOFAN ENGINE

(71) Applicant: PRATT & WHITNEY CANADA CORP., Longueuil (CA)

(72) Inventors: Daniel Van Den Ende, Mississauga (CA); Timothy Redford, Campbellville (CA); David Menheere, Norval (CA); Santo Chiappetta, Georgetown (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 157 days.

(21) Appl. No.: 16/552,131

(22) Filed: Aug. 27, 2019

(65) Prior Publication Data

US 2021/0062727 A1    Mar. 4, 2021

(51) Int. Cl.
*F02C 9/18* (2006.01)
*F02C 7/18* (2006.01)
*F02C 6/08* (2006.01)

(52) U.S. Cl.
CPC .................. *F02C 9/18* (2013.01); *F02C 6/08* (2013.01); *F02C 7/18* (2013.01)

(58) Field of Classification Search
CPC .... F02C 6/08; F02C 7/18; F02C 7/185; F02C 7/141; F02C 7/143; F02C 9/18; F02C 7/32; F02C 7/36
See application file for complete search history.

(56) References Cited

U.S. PATENT DOCUMENTS

| 4,535,606 | A | | 8/1985 | Rannenberg | |
|---|---|---|---|---|---|
| 4,999,994 | A | * | 3/1991 | Rüd | F02C 7/047 60/39.08 |
| 5,137,230 | A | * | 8/1992 | Coffinberry | B64D 13/06 244/118.5 |
| 5,987,877 | A | * | 11/1999 | Steiner | B64D 33/10 60/39.08 |
| 7,454,894 | B2 | * | 11/2008 | Larkin | F02C 7/14 60/226.1 |
| 9,109,514 | B2 | * | 8/2015 | Cheong | F02C 6/08 |
| 10,036,329 | B2 | * | 7/2018 | Suciu | F02K 3/04 |
| 10,059,458 | B2 | | 8/2018 | Squier | |
| 2012/0159961 | A1 | * | 6/2012 | Krautheim | F02K 3/115 60/782 |
| 2013/0098046 | A1 | | 4/2013 | Suciu et al. | |
| 2013/0187007 | A1 | * | 7/2013 | Mackin | F02C 6/04 244/134 R |
| 2016/0376021 | A1 | * | 12/2016 | Ullyott | F02B 41/10 60/783 |
| 2017/0218844 | A1 | * | 8/2017 | Hanrahan | F02C 3/04 |
| 2018/0128178 | A1 | | 5/2018 | Snape et al. | |
| 2018/0162537 | A1 | | 6/2018 | Schwarz et al. | |
| 2018/0216538 | A1 | | 8/2018 | Papa et al. | |

* cited by examiner

*Primary Examiner* — Alain Chau
*Assistant Examiner* — Thuyhang N Nguyen
(74) *Attorney, Agent, or Firm* — Norton Rose Fulbright Canada LLP

(57) ABSTRACT

Systems and methods for conditioning a fluid using bleed air from a bypass duct of a turbofan engine are disclosed. The system comprises a heat exchanger configured to facilitate heat transfer between a flow of bleed air from the bypass duct of the turbofan engine and the fluid, and a fluid propeller configured to drive the bleed air through the heat exchanger. The fluid propeller is disposed downstream of the heat exchanger.

9 Claims, 14 Drawing Sheets

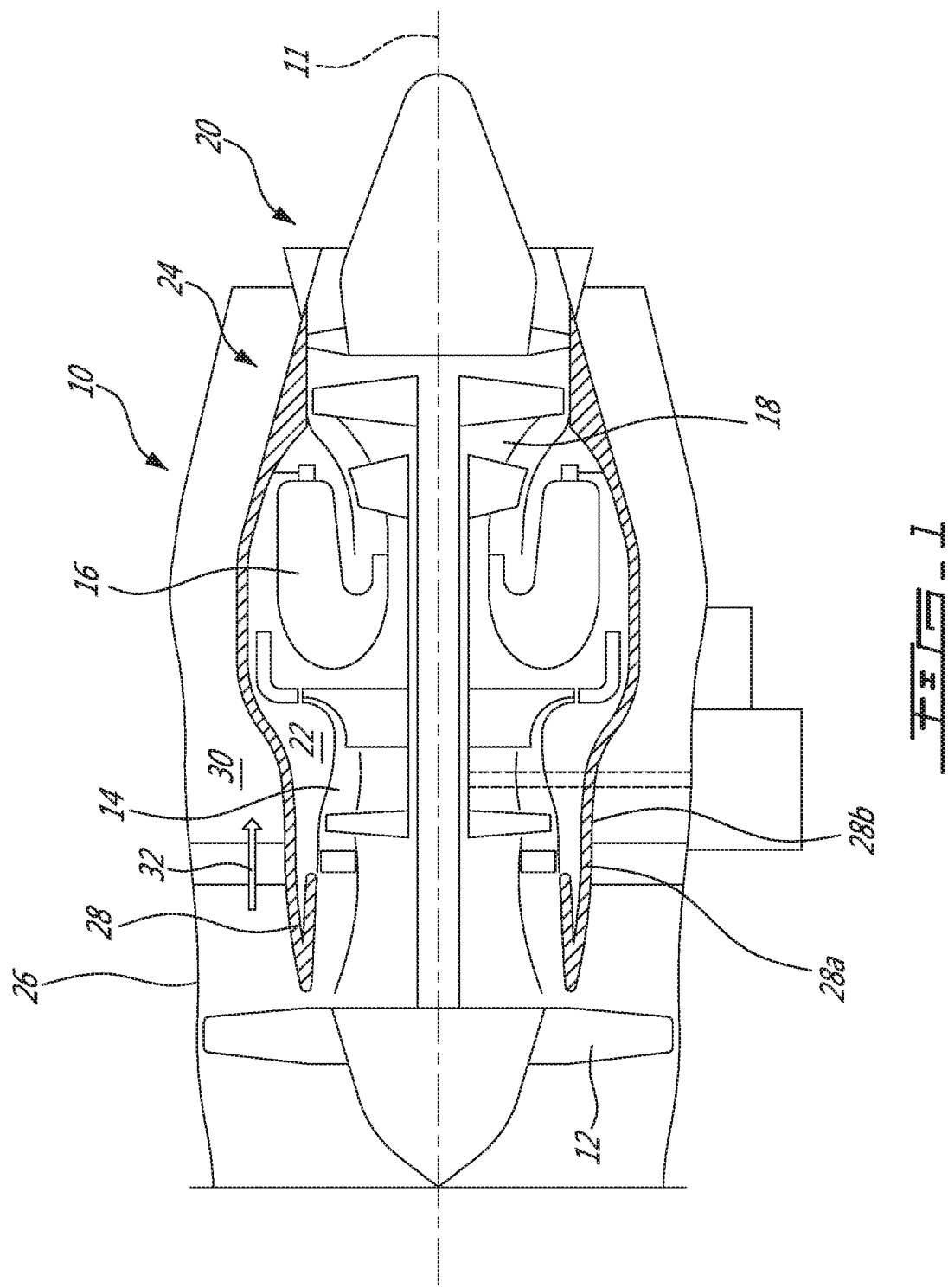

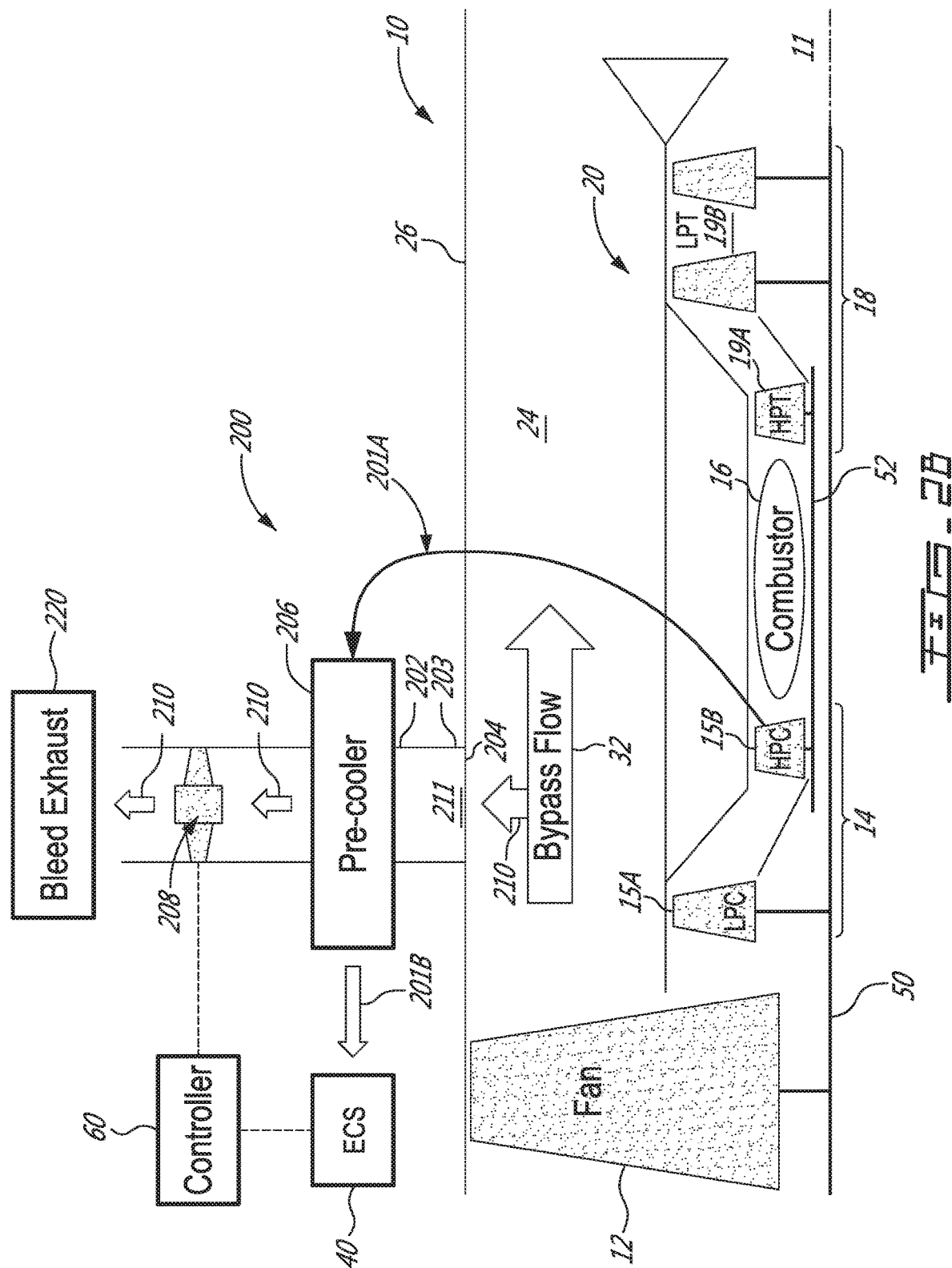

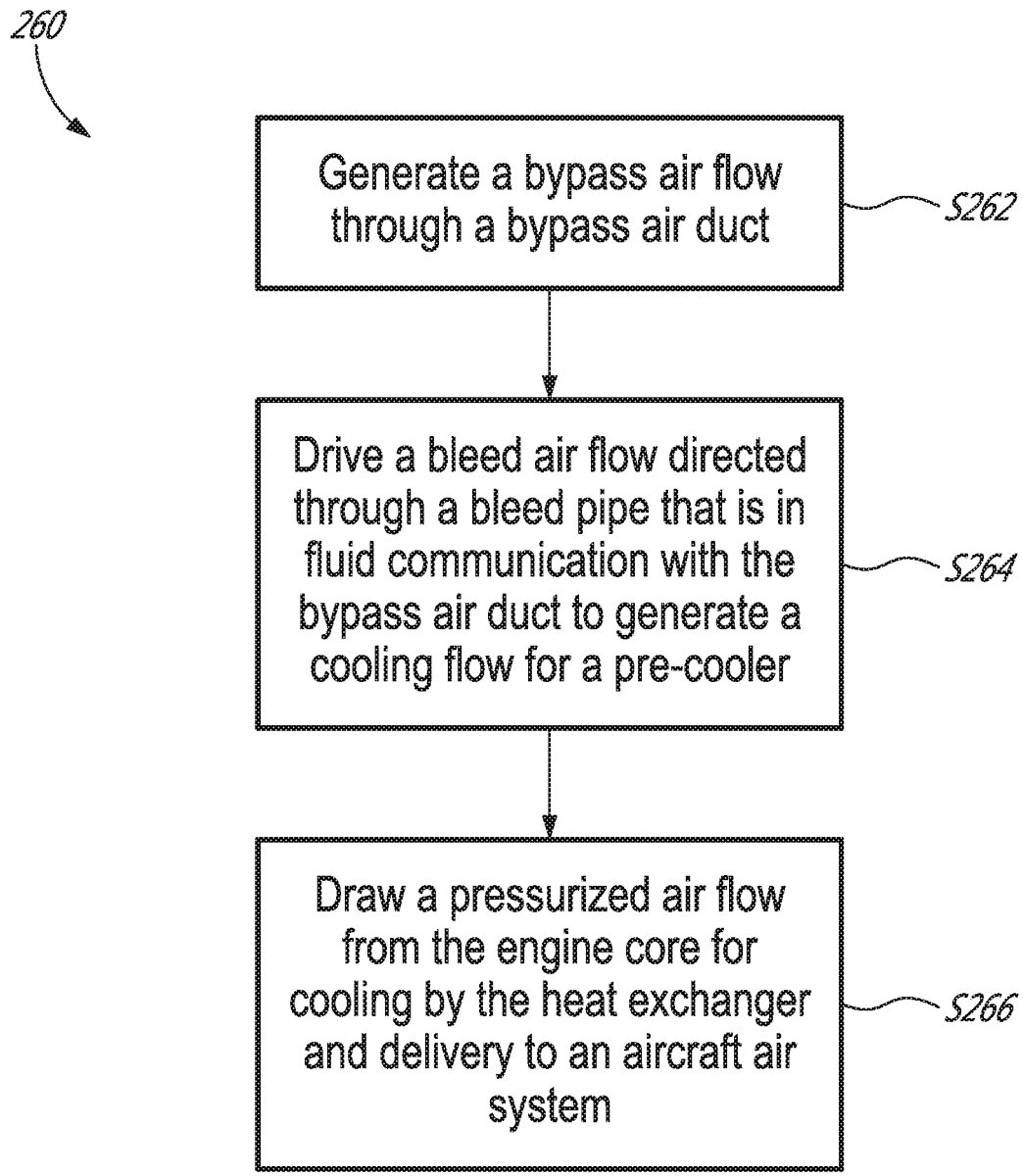

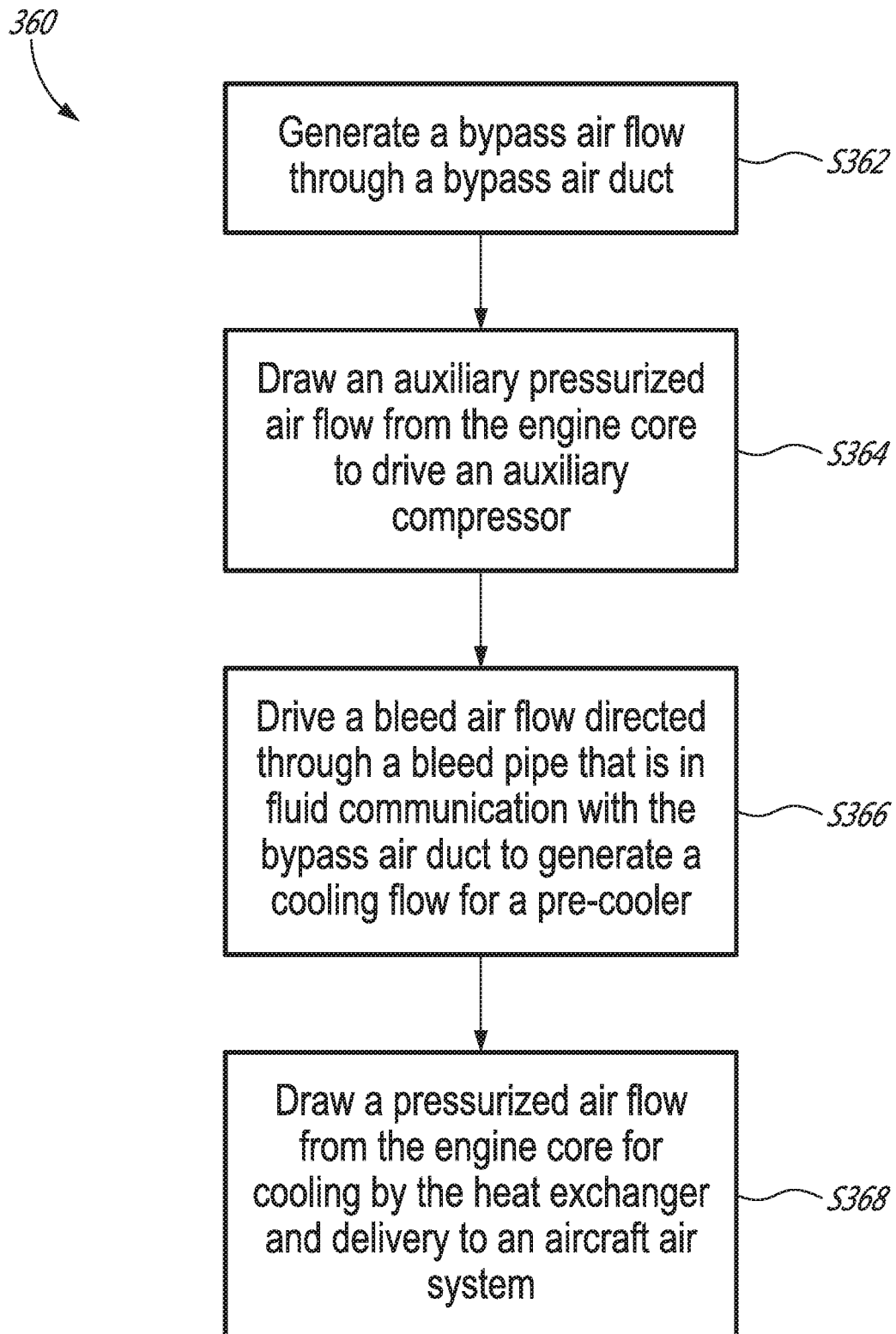

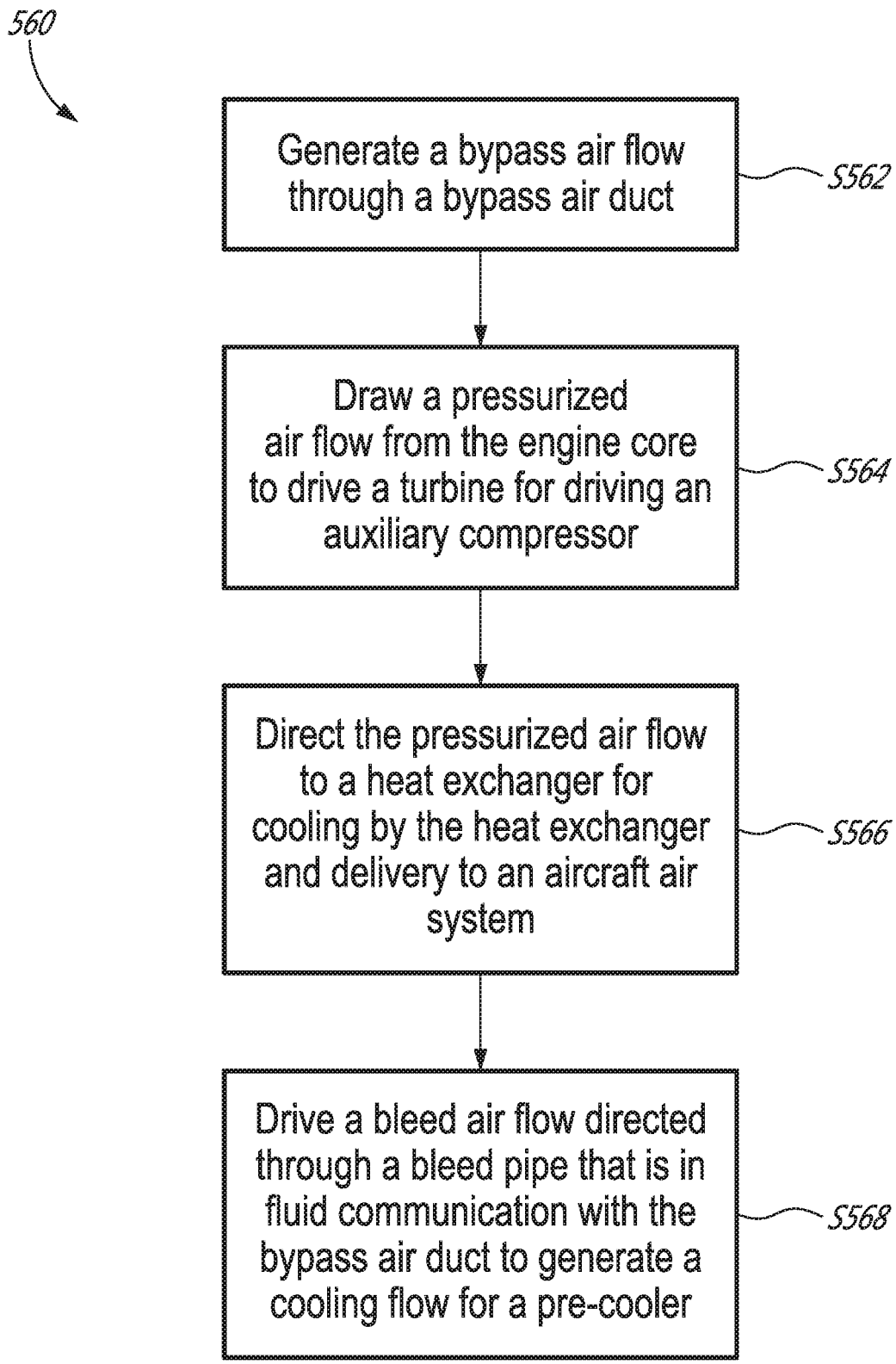

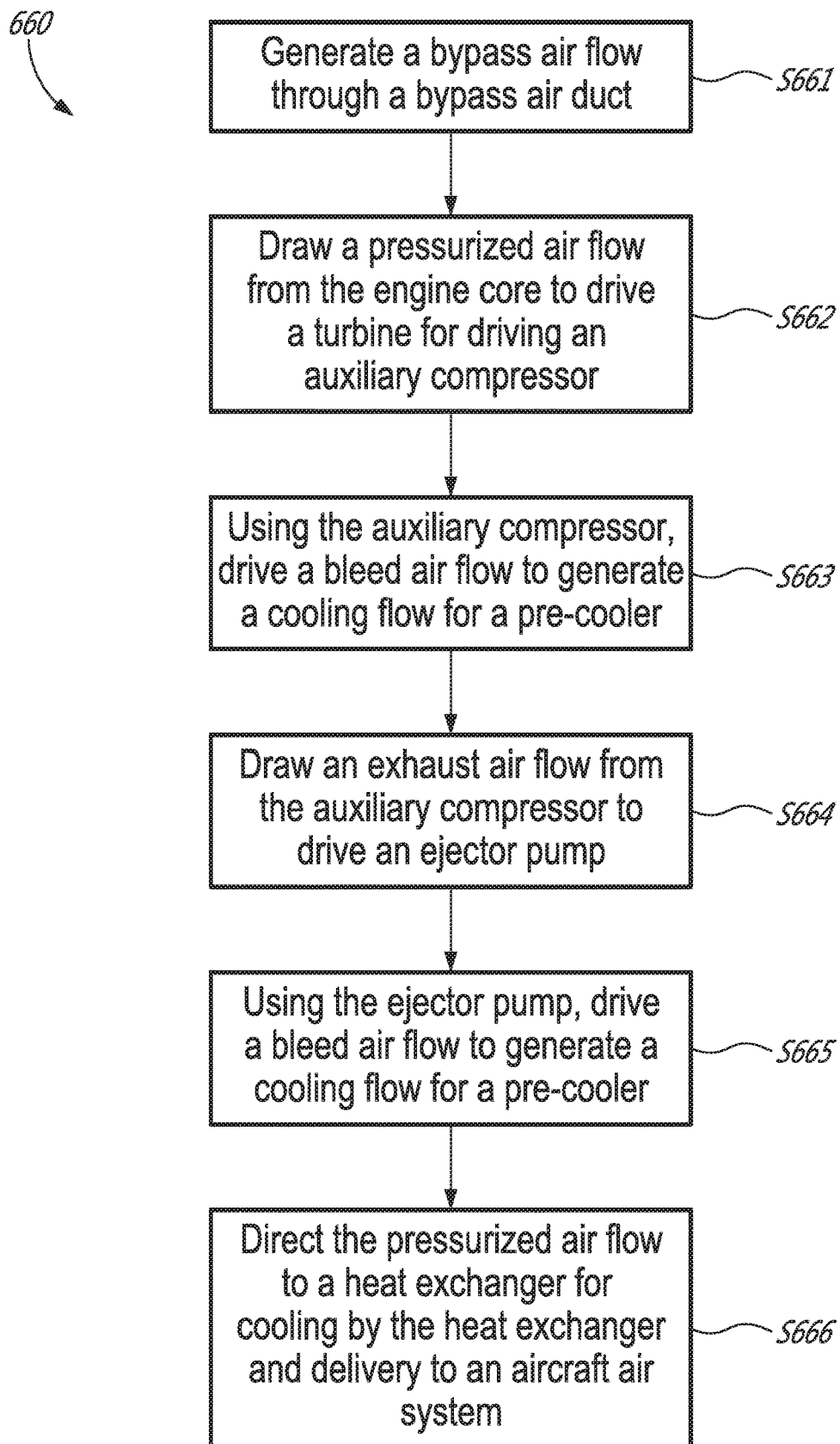

SYSTEM AND METHOD FOR CONDITIONING A FLUID USING BLEED AIR FROM A BYPASS DUCT OF A TURBOFAN ENGINE

FIELD

This relates to aircraft engines and, more particularly, to using bleed air from an aircraft engine to condition a fluid.

BACKGROUND

Turbofan gas turbine engines generally include a bypass air duct that directs a bypass air flow drawn by a fan. The bypass air duct surrounds an engine core including a compressor section, a combustor, and a turbine section. An opening in a wall of the bypass air duct communicates with a bleed pipe such that bleed air may be directed from the bypass air duct to a heat exchanger or pre-cooler via the bleed pipe. The pre-cooler can use the bypass air to cool a supply fluid such as pressurized air to an environmental control system or an ice control system of an aircraft for example. Such pre-coolers are typically sized to accommodate a maximum expected load and are housed in a pylon of an aircraft. The size of the pre-cooler can partially dictate a required size of the pylon.

SUMMARY

According to an aspect, there is provided a system for conditioning a fluid using bleed air from a bypass duct of a turbofan engine. The system comprises:

a heat exchanger configured to facilitate heat transfer between a flow of bleed air from the bypass duct of the turbofan engine and the fluid; and a fluid propeller configured to drive the bleed air through the heat exchanger, the fluid propeller disposed downstream of the heat exchanger.

According to another aspect, there is provided a system for conditioning supply air for an environmental control system of an aircraft. The system comprises:

a turbofan gas turbine engine having a bypass duct;

a heat exchanger configured to facilitate heat transfer between a flow of bleed air from the bypass duct and the supply air; and a fluid propeller configured to drive the bleed air through the heat exchanger, the fluid propeller disposed downstream of the heat exchanger.

According to another aspect, there is provided a method for conditioning a fluid using a flow of bleed air from a bypass duct of a turbofan engine. The method comprises:

at a heat transfer location, transferring heat between the fluid and the flow of bleed air from the bypass duct of the turbofan engine; and driving the flow of bleed air through the heat transfer location, a location of the driving being downstream of the heat transfer location.

Other features will become apparent from the drawings in conjunction with the following description.

BRIEF DESCRIPTION OF DRAWINGS

In the figures which illustrate example embodiments,

FIG. 1 is a partial schematic cross-sectional view of a gas turbine engine, in accordance with an embodiment;

FIG. 2B is a schematic cross-section view of a gas turbine engine with a fluid conditioning system having an auxiliary compressor downstream of a pre-cooler, in accordance with an embodiment;

FIG. 2C is a flow diagram of an example method for conditioning a fluid using a bleed air flow augmented by an auxiliary compressor, in accordance with an embodiment;

FIG. 3E is a flow diagram of an example method for conditioning a fluid using a bleed air flow augmented by a fluid-driven auxiliary compressor, in accordance with an embodiment;

FIG. 5B is a flow diagram of an example method for conditioning a fluid using a bleed air flow augmented by a mechanically-driven auxiliary compressor, in accordance with an embodiment;

FIG. 6B is a flow diagram of an example method for conditioning a fluid using a bleed air flow augmented by an auxiliary compressor and an ejector pump, in accordance with an embodiment.

DETAILED DESCRIPTION

Figure 2A:
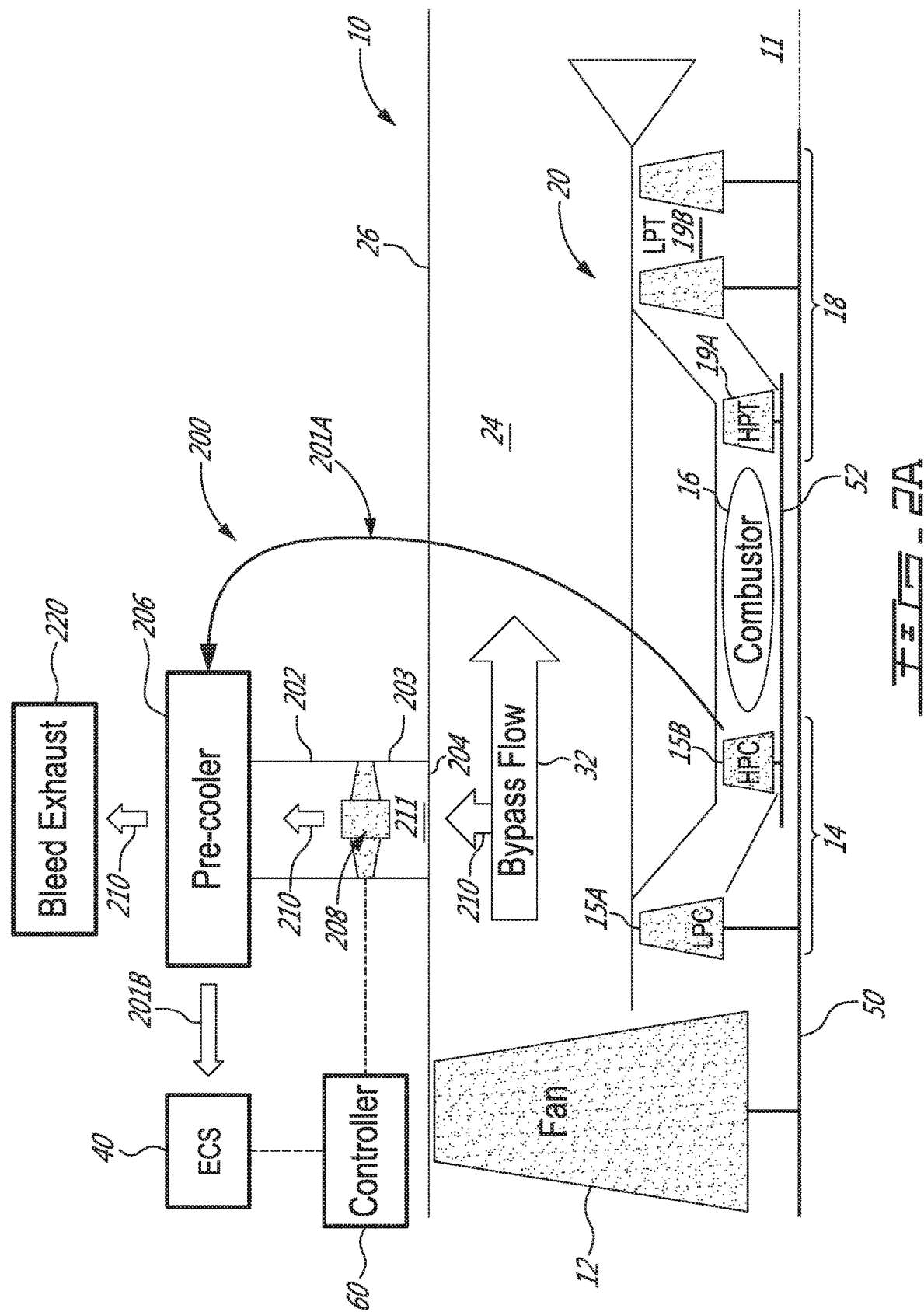
FIG. 2A is a schematic cross-section view of a gas turbine engine with a fluid conditioning system having an auxiliary compressor upstream of a pre-cooler, in accordance with an embodiment.

Pre-coolers used to cool air for aircraft systems, such as customer environmental control system (ECS) air, are designed and sized based on air properties provided by an engine supplier. As such, a pre-cooler is sized to fit a particular engine and designed to fit within a volume of the pylon of that engine. Bleed air flow from a bypass duct flow drawn from the engine fan may form a cooling flow for the pre-cooler.

However, aircraft design may change. In an example, the engine may be changed, and thus the pressure of the cooling flow supplied to the pre-cooler may be modified or reduced as compared to the initial engine. Typically, a solution to address a reduced pressure of cooling flow would be a re-design of the pre-cooler, as the lack of supply pressure from the bleed air flow means that the pre-cooler passages would need to be increased in order to provide adequate cooling flow to the pre-cooler. Increasing pre-cooler capacity can mean that the pre-cooler size would need to increase and, as a result, pylon design would need to be changed.

In the event the aircraft nacelle and pre-cooler have already passed through a design stage, a re-design of the nacelle and pre-cooler may be costly in time (for e.g., affecting aircraft delivery schedule), money, and aircraft performance (for e.g., a larger nacelle and/or pylon needed to fit a bigger pre-cooler may affect performance of the aircraft). An increase to nacelle or pylon size can result in aircraft fuel penalty during forward flight conditions, due to aerodynamic drag, thus affecting aircraft performance.

In embodiments disclosed herein, a fluid propeller, such as an auxiliary compressor and/or an ejector pump, may be used to increase the flow rate of bleed air flow as cooling air for a pre-cooler, for example, by increasing the pressure gradient or pressure differential across the pre-cooler. Such fluid propeller may be electrically or mechanically driven.

The use of the fluid propeller may allow for an otherwise undersized pre-cooler to be used since the fluid propeller can increase the flow of cooling air through the pre-cooler when needed. A smaller pre-cooler may allow for a smaller pylon size and therefore less aerodynamic drag.

A fluid propeller as described herein may be activated in conditions when additional cooling air flow is needed, which may be infrequent. Such conditions may include high air demand conditions while the engine is operating at a relatively low power, in an example, the demands of an anti-ice system while an aircraft is cruising at 15,000-20,000 feet in a holding condition.

A fluid propeller as described herein may be activated such that the additional power extraction required to drive the fluid propeller only affects thrust-specific fuel consumption (TFSC) at non-critical specific fuel consumption (SFC) conditions.

Thus, using techniques described herein, the flow rate of cooling air supplied to a pre-cooler may be increased without increasing nacelle or pylon size and the cooling air can sufficiently cool pressurized air for circulation to an aircraft system.

FIG. 1 illustrates a turbofan gas turbine engine 10 of a type provided for use in subsonic flight, generally comprising in serial flow communication along a centerline 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and the turbine section 18 form part of an engine core 20. The engine core 20 defines a main fluid path 22 in which the combustor 16 is provided. The engine core 20 is coaxially positioned within an annular bypass duct 24 including an annular radially outer bypass duct wall 26 and an annular radially inner bypass duct wall 28. The radially outer and inner bypass duct walls 26 and 28 define therebetween an annular bypass air passage 30 for directing a bypass air flow 32 drawn by the fan 12.

FIG. 2A illustrates an example of a gas turbine engine system, including engine 10 and a fluid conditioning system 200 having a fluid propeller, such as an auxiliary compressor 208, configured to drive bleed air flow 210 through pre-cooler 206. In the embodiment illustrated in FIG. 2A, auxiliary compressor 208 is disposed upstream of a pre-cooler 206. In some embodiments, auxiliary compressor 208 is disposed downstream of pre-cooler 206, for example, as shown in FIG. 2B.

Fluid conditioning system 200 is operable, among other things, to condition a supply fluid such as a pressurized air flow 201A drawn from engine core 20, in an example, from compressor section 14, for cooling by a heat exchanger such as a pre-cooler 206 using bleed air flow 210 bled from bypass duct 24, and forming a cooled pressurized air flow 201B for use in aircraft air systems, such as an environment control system (ECS) 40, an anti-ice system or secondary air systems of engine 10.

In the embodiment of engine 10 illustrated in FIG. 2A, compressor section 14 includes a low pressure compressor (LPC) 15A forming a stream for further compression by high pressure compressor (HPC) 15B to form further compressed air fed to combustor 16.

Turbine section 18 of engine 10 illustrated in FIG. 2A is a three-stage turbine, including a single-stage high pressure turbine (HPT) 19A and a two-stage power or low pressure turbine (LPT) 19B, for extracting energy from the combustion gases of engine 10. In other embodiments, turbine section 18 may be another suitable single stage or multi-stage turbine.

In some embodiments, a power shaft 50 and an engine core shaft 52 of engine 10 may be mechanically uncoupled, for example, in a dual spool configuration having a low-pressure spool and a high-pressure spool, respectively, and therefore may permit separate rotation. Thus, HPC 15B and HPT 19A may be mechanically uncoupled from LPC 15A and LPT 19B, and therefore may permit separate rotation.

Engine 10 may have a dual-spool configuration as described herein, but it is understood that engine 10 may not be limited to such configuration.

While FIG. 2A illustrates a gas turbine engine system including a turbofan gas turbine engine, any other suitable engine may be employed.

Fluid conditioning system 200 includes a bleed air conduit such as bleed pipe 202 having an inlet end 203 connected to one of outer bypass duct wall 26 or inner bypass duct wall 28 of bypass duct 24. In the embodiment of FIG. 2A, inlet end 203 of bleed pipe 202 is connected to outer bypass duct wall 26 of bypass duct 24 such that an opening 204 in outer bypass duct wall 26 of bypass duct 24 is aligned with a corresponding opening at inlet end 203 of bleed pipe 202.

Bleed pipe 202 is thus connected in fluid flow communication with bypass duct 24, such that bypass air flow 32 flowing within bypass duct 24 can be extracted from bypass duct 24 and into bleed pipe 202, via opening 204.

Bleed pipe 202 may extend perpendicularly from bypass duct 24, or at another suitable angle.

Bleed pipe 202 and opening 204 may be sized to admit a desired quantity of air, for example, to provide cooling air to pre-cooler 206, as discussed in further detail below.

Bleed pipe 202 defines a bleed fluid path 211 through which bleed air flow 210 flows, cools pre-cooler 206 as a cooling flow, and is exhausted to bleed exhaust 220, as described in further detail below.

Fluid conditioning system 200 also includes an air pathway or conduit establishing fluid communication between pre-cooler 206 and engine core 20 for directing pressurized air flow 201A from engine core 20 to pre-cooler 206.

In some embodiments, pressurized air flow 201A is drawn from a location downstream a low pressure compressor, such as LPC 15A, of engine core 20. In some embodiments, pressurized air flow 201A is drawn from a location downstream a high pressure compressor, such as HPC 15B, of the engine core 20.

In an example, pressurized air flow 201A may be drawn from HPC 15B of compressor section 14, such as compressor discharge air pressure (P3). In some embodiments, pressurized air flow 201A may be drawn from other suitable sections of compressor section 14 or other parts of engine core 20, such as between LPC 15A and HPC 15B.

Pressurized air flow 201A may be a relatively high pressure flow, and higher pressure than bleed air flow 210 within bleed pipe 202.

Pre-cooler 206 operates as a heat exchanger configured to facilitate heat transfer between a fluid, such as pressurized air flow 201A that is circulated in pre-cooler 206, and bleed air flow 210, to form cooled pressurized air flow 201B for use in aircraft air systems, such as an environment control system (ECS) 40.

Pre-cooler 206 is in fluid communication with bleed fluid path 211, which supplies air flow, such as bleed air flow 210, to cool pre-cooler 206.

In some embodiments, pre-cooler 206 has a body in which passages are defined, through which pressurized air flow 201A flows. The passages define heat exchange surfaces exposed to bleed fluid path 211 in bleed pipe 202.

Pre-cooler 206 may include projections of the passages that project into bleed fluid path 211, further defining heat exchange surfaces. For example, fins may project outwardly or inwardly, be radially or quasi-radially oriented, and may extend in a generally axial direction with reference to the direction of bleed air flow 210.

Pressurized air flow 201A is circulated in pre-cooler 206 by way of the passages, and air circulating in bleed pipe 202, such as bleed air flow 210, may circulate through the channels defined between the passages through which pressurized air flow 201A flows. Pressurized air flow 201A is thus placed in thermal exchange contact with a flow of cooling air, namely bleed air flow 210, coming from bleed fluid path 211.

It should be understood that other heat exchanger configurations for facilitating heat transfer between fluid streams can be suitable for pre-cooler 206.

In an example scenario, such as during an aircraft idle or descent at which point engine 10 is operating at a low power rating, pressurized air flow 201A may be at a lower pressure. In such scenarios, air flow for various systems may not require pre-cooling, and thus pre-cooler 206 may be bypassed which may avoid a loss of pressure of pressurized air flow 201A by pre-cooler 206.

Auxiliary compressor 208, an example fluid propeller, may increase flow rate of bleed air flow 210 through pre-cooler 206 by pushing air through pre-cooler 206 when disposed upstream pre-cooler 206, or by pulling air through pre-cooler 206 when disposed downstream pre-cooler 206.

Auxiliary compressor 208 may operate as a pressure augmenting device. For example, auxiliary compressor 208 disposed upstream of pre-cooler 206 (in the direction of bleed air flow 210) may increase static pressure upstream of pre-cooler 206. Auxiliary compressor 208 disposed downstream of pre-cooler 206 (in the direction of bleed air flow 210) may decrease static pressure downstream of pre-cooler 206 by generating a pressure drop immediately upstream auxiliary compressor 208. Thus, the pressure gradient or differential (in particular, a pressure drop) across pre-cooler 206 may be increased, and the flow rate of bleed air flow 210 through pre-cooler 206 increases.

Auxiliary compressor 208 may include a rotatable fan that rotates about an axis of rotation that is generally parallel to bleed air flow 210 to increase the flow of air in bleed fluid path 211.

In some embodiments, auxiliary compressor 208 is an axial compressor having one or more stages. In some embodiments, auxiliary compressor 208 is an axial compressor having multiple stages of alternating rotating and stationary airfoils, such that in operation, a given stage of rotating airfoils accelerate fluid flow (such as bleed air flow 210) in axial and circumferential directions and stationary airfoils convert the increased kinetic energy into static pressure through diffusion and redirect the flow to a next stage.

In some embodiments, auxiliary compressor 208 is a centrifugal compressor that adds kinetic energy to a fluid flow (such as bleed air flow 210) through an impeller, and the kinetic energy is then converted to increase static pressure by slowing the flow through a diffuser.

In some embodiments, auxiliary compressor 208 is powered electrically with power to an electrical motor or by way of an electric generator (not shown) driven by engine 10 or by way of some other suitable electric source (e.g., battery).

In some embodiments, auxiliary compressor 208 is powered mechanically. In an example, auxiliary compressor 208 may be fluid-driven, such as driven by a flow of pressurized air. In another example, auxiliary compressor 208 may be drivingly coupled to an accessory gearbox (AGB) driven by a power shaft, for example, power shaft 50, connected to and driven by one or more turbines of turbine section 18. In a further example, auxiliary compressor 208 may be driven by a compressor shaft of engine 10.

As shown in FIG. 2A, with auxiliary compressor 208 upstream of pre-cooler 206, bleed air flow 210 is compressed by auxiliary compressor 208, increasing pressure in bleed fluid path 211 and thereby increasing the flow of bypass air flow 210 supplied to cool pre-cooler 206 which is then exhausted to bleed exhaust 220, for example, dumped into an exhaust stream fed into a pylon section of the aircraft which then exits overboard at a rear of the pylon.

Auxiliary compressor 208 may be operatively disposed upstream of pre-cooler 206, as shown by way of example in FIG. 2A, or downstream of pre-cooler 206, as shown by way of example in FIG. 2B.

As shown in FIG. 2B, with auxiliary compressor 208 downstream of pre-cooler 206, bleed air flow 210 travels as a cooling flow through pre-cooler 206 before reaching auxiliary compressor 208 which increases the flow rate of bleed air flow 210 through pre-cooler 206. Bleed air flow 210 is then exhausted to bleed exhaust 220, for example, dumped into an exhaust stream fed into a pylon section of the aircraft and exited overboard at a rear of the pylon.

Conveniently, auxiliary compressor 208 disposed downstream of pre-cooler 206 may have the benefit of not further raising the temperature of bleed air flow 210 prior to entry into pre-cooler 206 for cooling pressurized air flow 201A.

In some embodiments, a first fluid propeller, such as auxiliary compressor 208, is disposed downstream of a heat exchanger such as pre-cooler 206, and a second fluid propeller, such as auxiliary compressor 208, is disposed upstream of a heat exchanger such as pre-cooler 206.

FIG. 2C is a flow diagram of an example method 260 for conditioning a fluid, such as pressurized air flow 201A, using bleed air flow 210 augmented by auxiliary compressor 208, in accordance with an embodiment. The blocks are provided for illustrative purposes. Variations of the blocks, omission or substitution of various blocks, or additional blocks may be considered. Method 260 may be performed using various components of a gas turbine engine system, including fluid conditioning system 200 and auxiliary compressor 208, as described herein.

At block S262, bypass air flow 32 is generated in bypass duct 24 by fan 12 that is drivingly coupled to engine core 20 of engine 10.

At block S264, auxiliary compressor 208 drives flow of bleed air flow 210, and in some embodiments increases a flow rate of bleed air flow 210, through bleed pipe 202 that is in fluid communication with bypass duct 24. In some embodiments, auxiliary compressor 208 is disposed upstream a heat exchanger, such as pre-cooler 206, and thus a location of driving bleed air flow 210 is upstream a heat exchanger. In some embodiments, auxiliary compressor 208 is disposed downstream a heat exchanger, such as pre-cooler 206, and thus a location of driving bleed air flow 210 is downstream a heat exchanger.

At block S266, pressurized air flow 201A is drawn from engine core 20 for cooling by a heat exchanger such as pre-cooler 206, at a heat transfer location to transfer heat between pressurized air flow 201A and bleed air flow 210, and for delivery of cooled pressurized air flow 201B, for example, to ECS 40 of the aircraft, or other suitable aircraft air system.

It should be understood that one or more of the blocks may be performed in a different sequence or in an interleaved or iterative manner.

Figure 3A:
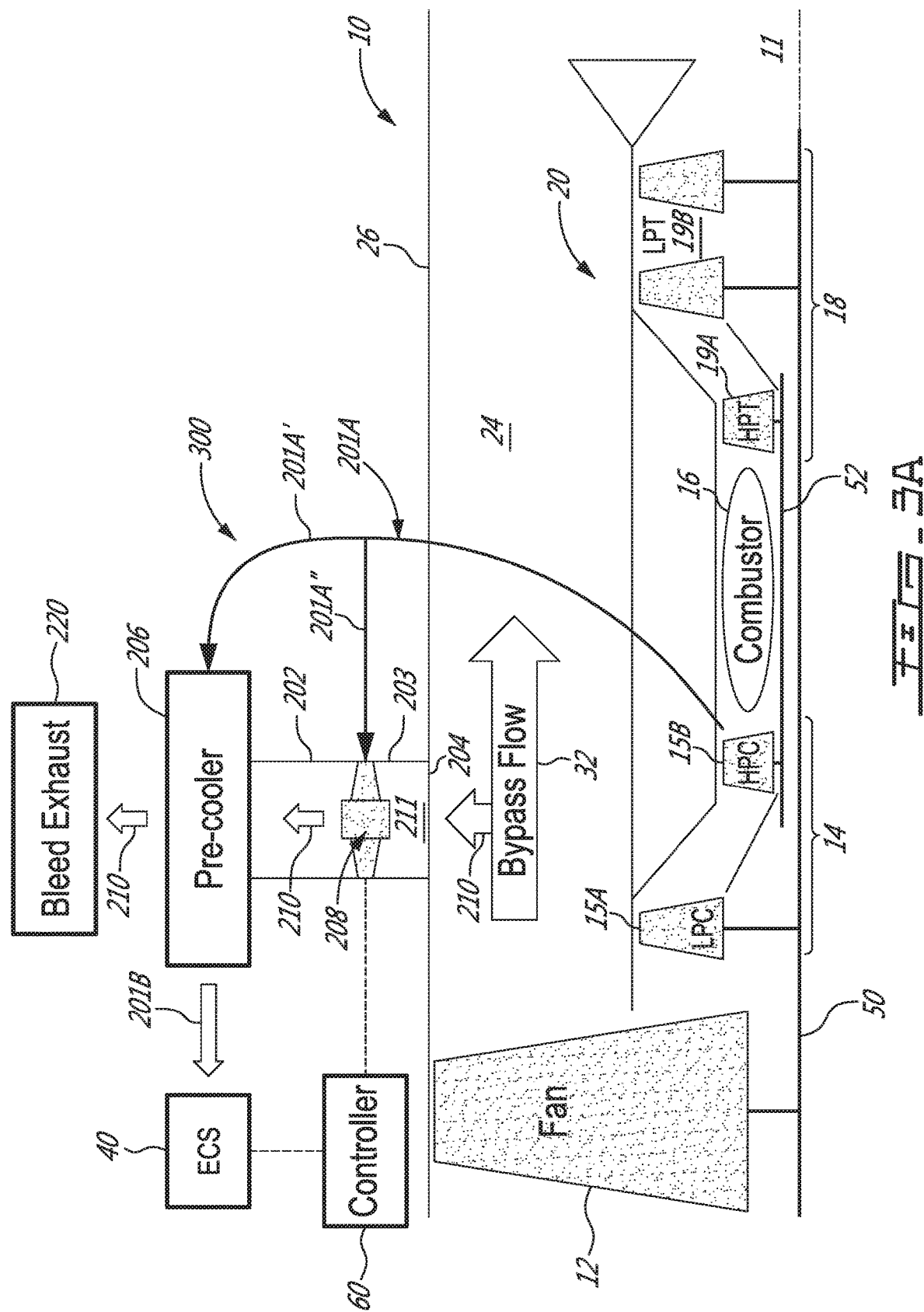
FIG. 3A is a schematic cross-section view of a gas turbine engine with a fluid conditioning system having a fluid-driven auxiliary compressor upstream of a pre-cooler, in accordance with an embodiment.
Figure 3B:
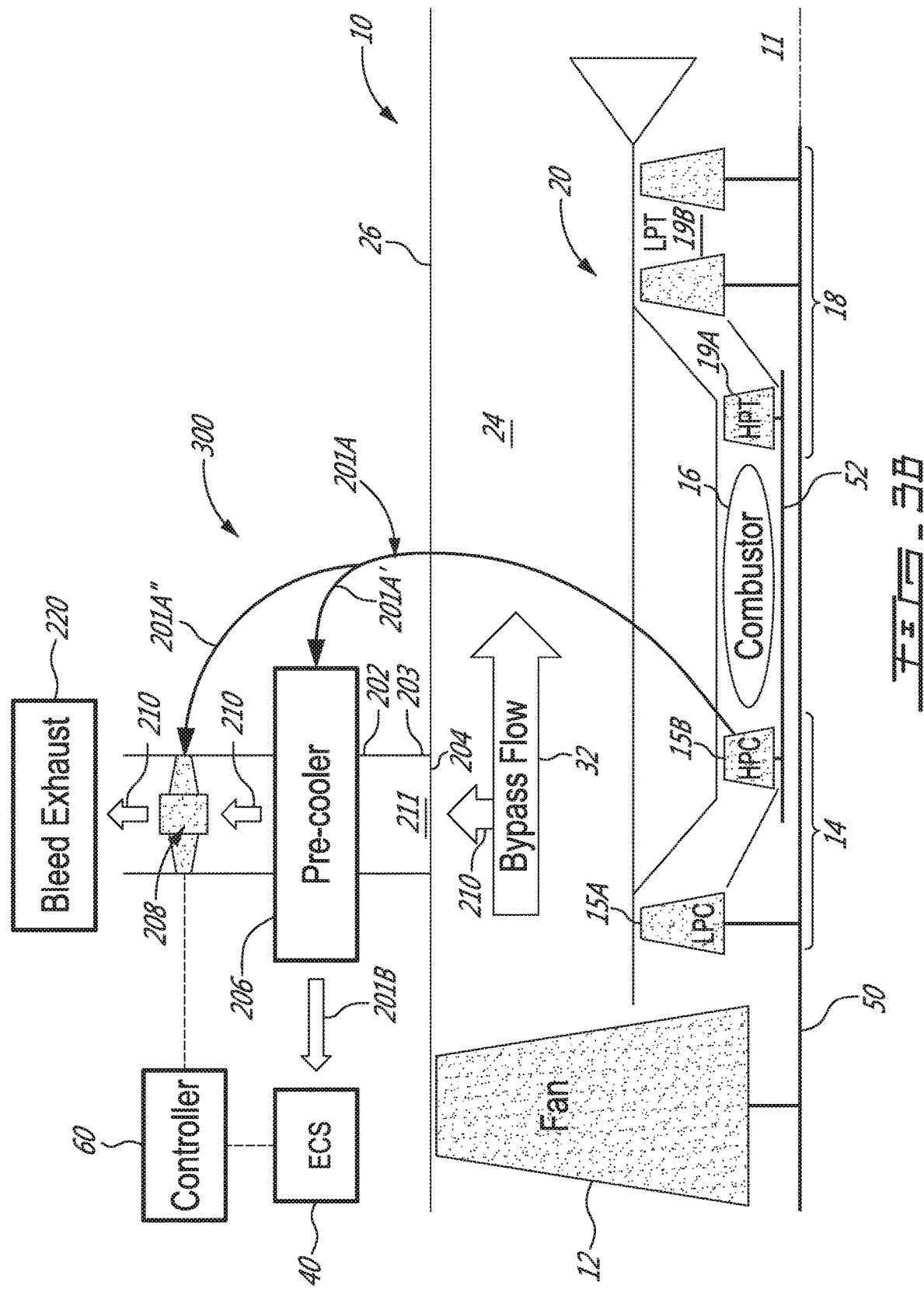
FIG. 3B is a schematic cross-section view of a gas turbine engine with a fluid conditioning system having a fluid-driven auxiliary compressor downstream of a pre-cooler, in accordance with an embodiment.

FIGS. 3A and 3B illustrate an example of a gas turbine engine system, including engine 10 and a fluid conditioning system 300.

As shown in FIGS. 3A and 3B, fluid conditioning system 300 includes some of the same structure and components as the architecture of fluid conditioning system 200, including bleed pipe 202 having inlet end 203 and defining bleed fluid path 211 through which bleed air flow 210 flows and is exhausted to bleed exhaust 220, auxiliary compressor 208, as well as pre-cooler 206, as described herein.

Fluid conditioning system 300 is operable, among other things, to condition a fluid such as a pre-cooler pressurized air flow 201A' drawn from engine core 20 for cooling by a heat exchanger such as pre-cooler 206 using bleed air flow 210 bled from bypass duct 24, and forming cooled pressurized air flow 201B for use in aircraft air systems, such as an environment control system (ECS) 40, an anti-ice system or secondary air systems of engine 10.

Fluid conditioning system 300 includes a fluid-driven embodiment of auxiliary compressor 208 that is driven by a pressurized air flow, described in further detail below.

Fluid conditioning system 300 includes an air pathway or conduit establishing fluid communication between engine core 20 and pre-cooler 206 as well as between engine core 20 and auxiliary compressor 208, for directing pressurized air flow 201A drawn from engine core 20 to pre-cooler 206 and auxiliary compressor 208.

Figure 3D:
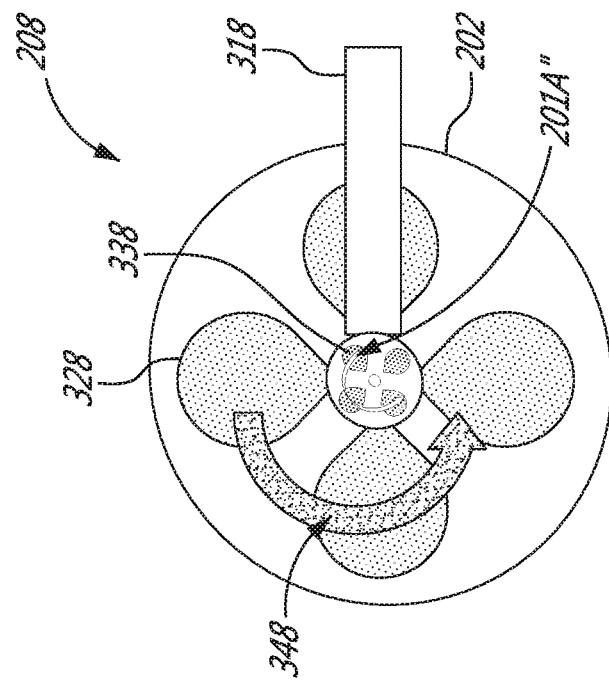
FIG. 3D is a schematic of a fluid-driven auxiliary compressor with an internal turbine, in accordance with an embodiment.
Figure 3C:
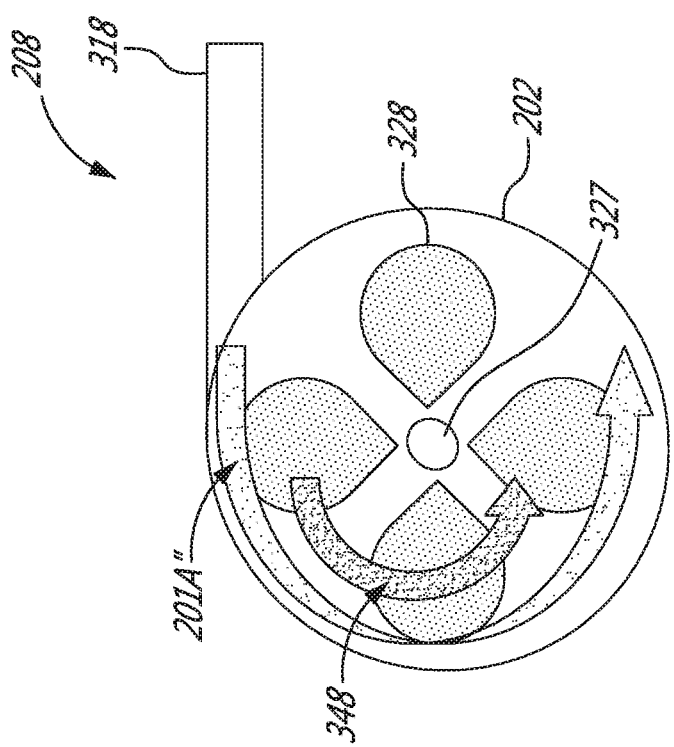
FIG. 3C is a schematic of a fluid-driven auxiliary compressor, in accordance with an embodiment.

In some embodiments, fluid communication between engine core 20 and auxiliary compressor 208 is established by an air pathway or conduit, such as fan drive pipe 318 as shown in FIGS. 3C and 3D, branched off from an air pathway or conduit between engine core 20 and pre-cooler 206. Thus, pressurized air flow 201A is diverted between a pre-cooler pressurized air flow 201A' to pre-cooler 206 and an auxiliary pressurized air flow 201A" to auxiliary compressor 208 and auxiliary pressurized air flow 201A" is a diverted portion of pressurized air flow 201A.

In some embodiments, pressurized air flow 201A is drawn from a location downstream a low pressure compressor, such as LPC 15A, of engine core 20. In some embodiments, pressurized air flow 201A is drawn from a location downstream a high pressure compressor, such as HPC 15B, of the engine core 20.

In an example, pressurized air flow 201A may be drawn from HPC 15B of compressor section 14, such as compressor discharge air pressure (P3). In some embodiments, pressurized air flow 201A may be drawn from other suitable sections of compressor section 14 or other parts of engine core 20, such as between LPC 15A and HPC 15B.

Pressurized air flow 201A may be a relatively high pressure flow, and higher pressure than bleed air flow 210 within bleed pipe 202. Similarly, pre-cooler pressurized air flow 201A' and auxiliary pressurized air flow 201A" may be relatively high pressure flows, and higher pressure than bleed air flow 210 within bleed pipe 202.

Auxiliary compressor 208, an example fluid propeller, may increase flow rate of bleed air flow 210 through pre-cooler 206 by pushing air through pre-cooler 206 when disposed upstream pre-cooler 206, or by pulling air through pre-cooler 206 when disposed downstream pre-cooler 206.

In an embodiment illustrated in FIG. 3A, auxiliary compressor 208 is driven by a pressurized air flow, in an example, auxiliary pressurized air flow 201A" from engine core 20.

FIG. 3C is a schematic of an example auxiliary compressor 208 inside bleed pipe 202. As shown in FIG. 3C, in some embodiments, auxiliary compressor 208 includes a bladed rotor 327 having outer radius fan blades 328 for driving bleed air flow 210. Bladed rotor 327 may be configured to be driven by impingement of a fluid, such as auxiliary pressurized air flow 201A" on outer radius fan blades 328 of bladed rotor 327.

To drive auxiliary compressor 208, auxiliary pressurized air flow 201A" may be directed towards outer radius fan blades 328, resulting in rotation of outer radius fan blades 328 and movement of air flow through bleed fluid path 211 and increasing flow of bleed air flow 210 as a cooling flow through pre-cooler 206.

In some embodiments, an exit flow of auxiliary pressurized air flow 201A", from rotation of outer radius fan blades 328, may be mixed with bleed air flow 210. In configurations in which auxiliary compressor 208 is upstream pre-cooler 206, the exit flow of auxiliary pressurized air flow 201A" may be mixed with bleed air flow 210 if flow rates and temperatures allow. The configuration of auxiliary compressor 208 shown in FIG. 3C may be used upstream or downstream of pre-cooler 206.

In some embodiments, auxiliary compressor 208 may also include a second bladed rotor, such as an internal shaft turbine 338, that is drivingly coupled to bladed rotor 327 and outer radius fan blades 328, as shown in FIG. 3D. In some embodiments, bladed rotor 327 and internal shaft turbine 338 are coupled for common rotation. In some embodiments, internal shaft turbine 338 is disposed inside a hub of bladed rotor 327.

Internal shaft turbine 338 may be configured to be driven by impingement of a fluid, such as auxiliary pressurized air flow 201A" on turbine blades of internal shaft turbine 338.

To drive auxiliary compressor 208, auxiliary pressurized air flow 201A" may be directed towards internal shaft turbine 338, resulting in rotation of internal shaft turbine 338, which in turn rotates outer radius fan blades 328 resulting in movement of air flow through bleed fluid path 211 and increasing flow of bleed air flow 210 as a cooling flow through pre-cooler 206.

In some embodiments, an exit flow of auxiliary pressurized air flow 201A", from rotation of internal shaft turbine 338, may be mixed with bleed air flow 210. In configurations in which auxiliary compressor 208 is upstream pre-cooler 206, the exit flow of auxiliary pressurized air flow 201A" may be mixed with bleed air flow 210 if flow rates and temperatures allow.

In some embodiments, bladed rotor 327 and internal shaft turbine 338 are fluidically separated to substantially prevent mixing of bleed air flow 210 and an exit flow of auxiliary pressurized air flow 201A". In some embodiments, the exit flow may be captured and exhausted external to bleed air flow 210.

Auxiliary compressor 208 may be operatively disposed upstream of pre-cooler 206, as shown by way of example in FIG. 3A, or downstream of pre-cooler 206, as shown by way of example in FIG. 3B.

Conveniently, auxiliary compressor 208 disposed downstream of pre-cooler 206 may have the benefit of not further raising the temperature of bleed air flow 210 prior to entry into pre-cooler 206 for cooling pre-cooler pressurized air flow 201A'.

As shown in FIG. 3B, with auxiliary compressor 208 downstream of pre-cooler 206, bleed air flow 210 travels as a cooling flow through pre-cooler 206 before reaching auxiliary compressor 208, thereby increasing the flow rate of air supplied to cool pre-cooler 206, and which is then exhausted to bleed exhaust 220, for example, dumped into an exhaust stream fed into a pylon section of the aircraft and exited overboard at a rear of the pylon.

FIG. 3E is a flow diagram of an example method 360 for conditioning a fluid, such as pre-cooler pressurized air flow 201A', using bleed air flow 210 augmented by a fluid-driven configuration of auxiliary compressor 208, in accordance with an embodiment. The blocks are provided for illustrative purposes. Variations of the blocks, omission or substitution of various blocks, or additional blocks may be considered. Method 360 may be performed using various components of a gas turbine engine system, including fluid conditioning system 300 and auxiliary compressor 208, as described herein.

At block S362, bypass air flow 32 is generated in bypass duct 24 by fan 12 that is drivingly coupled to engine core 20 of engine 10.

At block S364, auxiliary pressurized air flow 201A" is drawn from engine core 20 to drive auxiliary compressor 208.

At block S366, auxiliary compressor 208 drives flow of bleed air flow 210, and in some embodiments increases a flow rate of bleed air flow 210, through bleed pipe 202 that is in fluid communication with bypass duct 24. In some embodiments, auxiliary compressor 208 is disposed upstream a heat exchanger, such as pre-cooler 206, and thus a location of driving bleed air flow 210 is upstream a heat exchanger. In some embodiments, auxiliary compressor 208 is disposed downstream a heat exchanger, such as pre-cooler 206, and thus a location of driving bleed air flow 210 is downstream a heat exchanger.

At block S368, pre-cooler pressurized air flow 201A' is drawn from engine core 20 for cooling by a heat exchanger such as pre-cooler 206, at a heat transfer location to transfer heat between pre-cooler pressurized air flow 201A' and bleed air flow 210, and for delivery of cooled pressurized air flow 201B, for example, to ECS 40 of the aircraft, or other suitable aircraft air system.

In some embodiments, pre-cooler pressurized air flow 201A' and auxiliary pressurized air flow 201A" are both portions of pressurized air flow 201A, and are both drawn from a same location of engine core 20.

It should be understood that one or more of the blocks may be performed in a different sequence or in an interleaved or iterative manner.

Figure 4A:
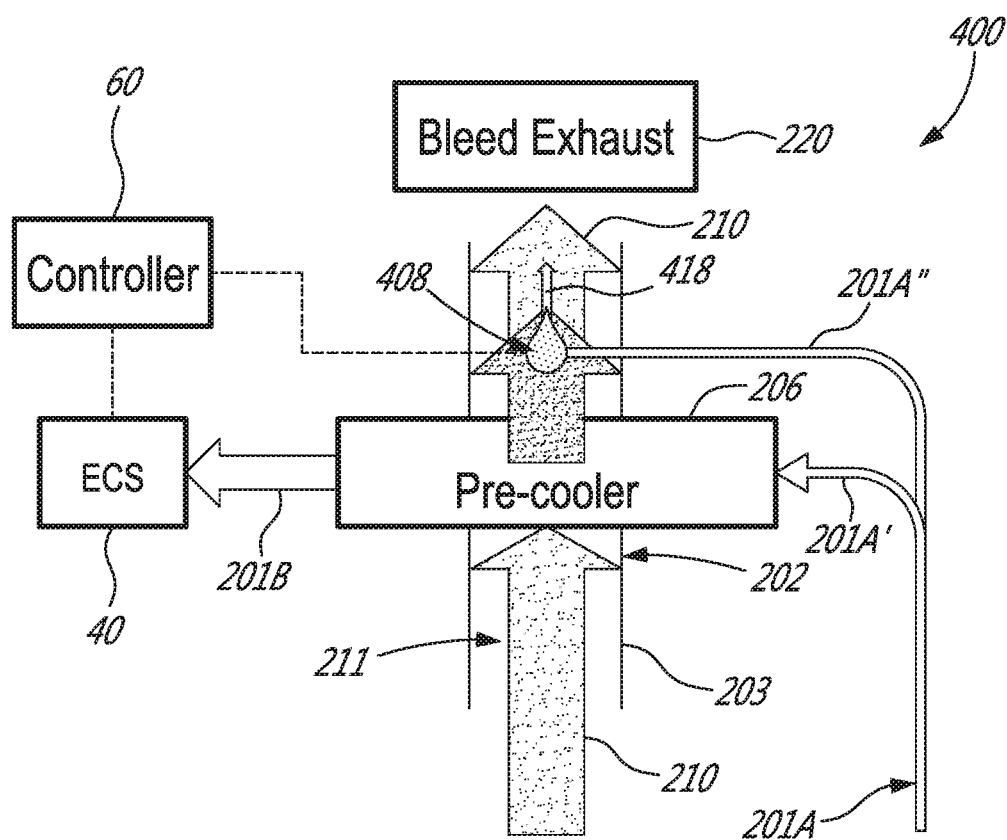
FIG. 4A is a schematic of a fluid conditioning system having an ejector pump, in accordance with an embodiment.

FIG. 4A is a schematic of a fluid conditioning system 400 having an ejector pump 408, in accordance with an embodiment. Fluid conditioning system 400 may be part of a gas turbine engine system that also includes engine 10 (not shown in FIG. 4A).

Fluid conditioning system 400 includes some of the same structure and components as the architecture of fluid conditioning system 200, including bleed pipe 202 having inlet end 203 and defining bleed fluid path 211 through which bleed air flow 210 flows and is exhausted to bleed exhaust 220, as well as pre-cooler 206, as described herein.

In place of auxiliary compressor 208, fluid conditioning system 400 may include ejector pump 408.

Fluid conditioning system 400 is operable, among other things, to condition a fluid such as pre-cooler pressurized air flow 201A' drawn from engine core 20 for cooling by a heat exchanger such as pre-cooler 206 using bleed air flow 210 bled from bypass duct 24, and forming cooled pressurized air flow 201B for use in aircraft air systems, such as an environment control system (ECS) 40, an anti-ice system or secondary air systems of engine 10.

Fluid conditioning system 400 includes an air pathway or conduit establishing fluid communication between engine core 20 and pre-cooler 206 as well as ejector pump 408 for directing pressurized air flow 201A drawn from engine core 20 to pre-cooler 206 and ejector pump 408.

In some embodiments, fluid communication between engine core 20 and ejector pump 408 is established by an air pathway or conduit branched off from an air pathway or conduit between engine core 20 and pre-cooler 206. Thus, pressurized air flow 201A is diverted between a pre-cooler pressurized air flow 201A' to pre-cooler 206 and an auxiliary pressurized air flow 201A" to ejector pump 408 and auxiliary pressurized air flow 201A" is a diverted portion of pressurized air flow 201A.

In some embodiments, pressurized air flow 201A is drawn from a location downstream a low pressure compressor, such as LPC 15A, of engine core 20. In some embodiments, pressurized air flow 201A is drawn from a location downstream a high pressure compressor, such as HPC 15B, of the engine core.

In an example, pressurized air flow 201A may be drawn from HPC 15B of compressor section 14, such as compressor discharge air pressure (P3). In some embodiments, pressurized air flow 201A may be drawn from other suitable sections of compressor section 14 or other parts of engine core 20, such as between LPC 15A and HPC 15B.

Pressurized air flow 201A may be a relatively high pressure flow, and higher pressure than bleed air flow 210 within bleed pipe 202. Similarly, pre-cooler pressurized air flow 201A' and auxiliary pressurized air flow 201A" may be relatively high pressure flows, and higher pressure than bleed air flow 210 within bleed pipe 202.

Fluid conditioning system 400 includes a pneumatic ejector such as ejector pump 408, an example fluid propeller configured to drive bleed air flow 210 through pre-cooler 206, to increase pressure differential, and thus air flow rate, across pre-cooler 206.

Ejector pump 408 is driven by a higher-pressure pressurized air flow, in an example, auxiliary pressurized air flow 201A" from engine core 20, to pump lower pressure pump bleed air flow 210.

Ejector pump 408 may include a nozzle that allows motive fluid such as auxiliary pressurized air flow 201A" to enter a mixing chamber or region into which suction fluid such as bleed air flow 210 is also received. The auxiliary pressurized air flow 201A" may further energize and entrain the bleed air flow 210. The ejector pump 408 may have an outlet via which the mixture of auxiliary pressurized air flow 201A" and bleed air flow 210 is discharged. The ejector pump 408 may have a diffuser through which the mixture of auxiliary pressurized air flow 201A" and bleed air flow 210 flows prior to being discharged via the outlet.

A relatively small amount of higher pressure air, such as auxiliary pressurized air flow 201A", may be used to increase the flow rate of the slower, lower pressure air that forms bleed air flow 210, for example, at a ratio of ~1% higher pressure air to lower pressure air.

Ejector pump 408 generates ejector exhaust flow 418 from auxiliary pressurized air flow 201A" that, in some embodiments, exhausts to bleed pipe 202.

In some embodiments, a valve (not shown) may be placed on auxiliary pressurized air flow 201A" line to modulate the flow of auxiliary pressurized air flow 201A" and thus allow ejector pump 408 to be turned on or off as desired. The valve may be a ball valve, or other suitable valve.

FIG. 4A illustrates fluid conditioning system 400 having ejector pump 408 operatively disposed downstream of pre-cooler 206, in accordance with an embodiment. In some embodiments, ejector pump 408 may be disposed upstream of pre-cooler 206.

Conveniently, ejector pump 408 disposed downstream of pre-cooler 206 may have the benefit of not further raising the temperature of bleed air flow 210 prior to entry into pre-cooler 206 for cooling pre-cooler pressurized air flow 201A'.

In some embodiments, a first fluid propeller, such as ejector pump 408, is disposed downstream of a heat exchanger such as pre-cooler 206, and a second fluid propeller, such as ejector pump 408 or other type, is disposed upstream of a heat exchanger such as pre-cooler 206.

Figure 4B:
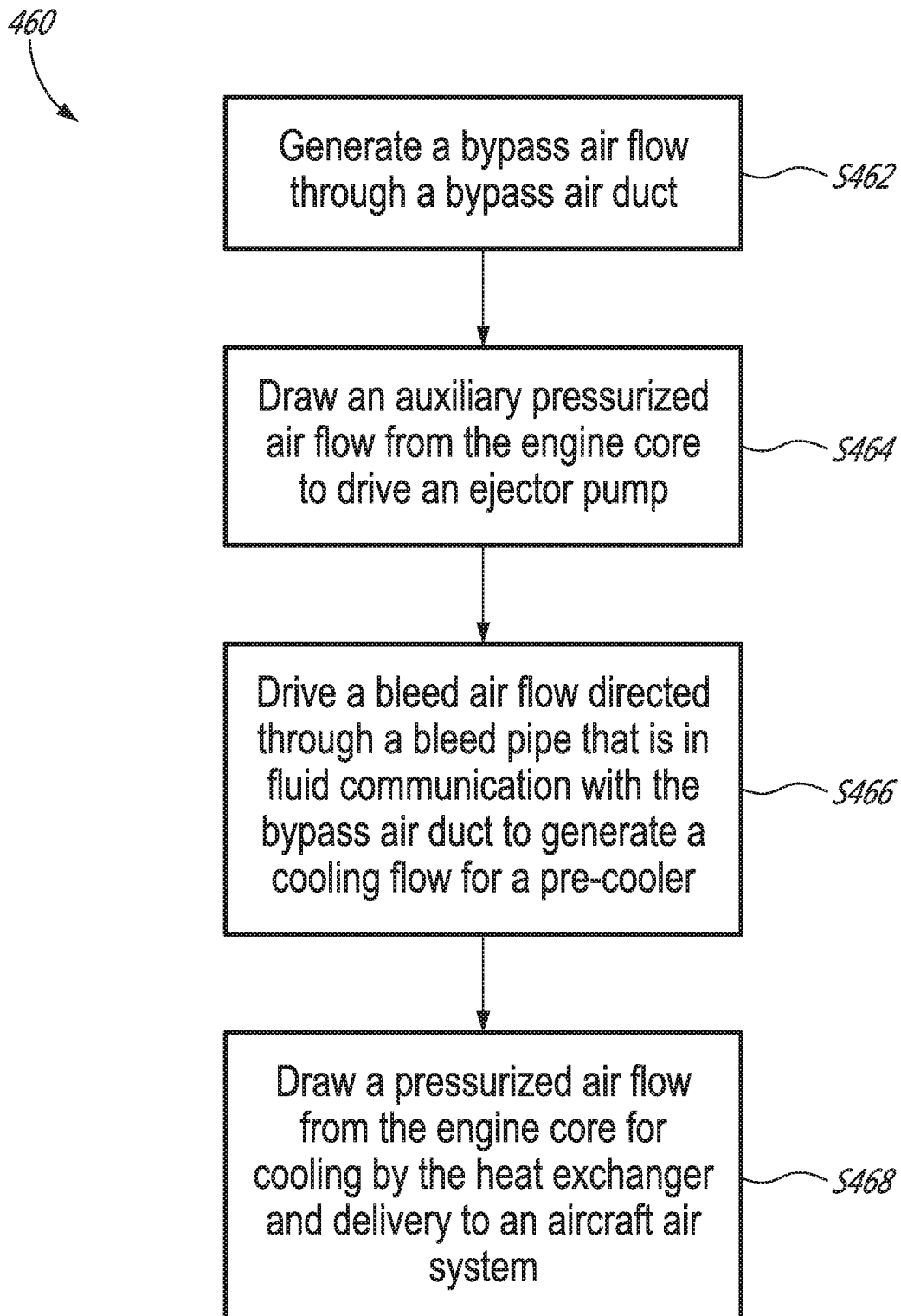
FIG. 4B is a flow diagram of an example method for conditioning a fluid using a bleed air flow augmented by an ejector pump, in accordance with an embodiment.

FIG. 4B is a flow diagram of an example method 460 for conditioning a fluid, such as pre-cooler pressurized air flow 201A', using bleed air flow 210 augmented by ejector pump 408, in accordance with an embodiment. The blocks are provided for illustrative purposes. Variations of the blocks, omission or substitution of various blocks, or additional blocks may be considered. Method 460 may be performed using various components of a gas turbine engine system, including fluid conditioning system 400 and ejector pump 408, as described herein.

At block S462, bypass air flow 32 is generated in bypass duct 24 by fan 12 that is drivingly coupled to engine core 20 of engine 10.

At block S464, auxiliary pressurized air flow 201A" is drawn from engine core 20 to drive ejector pump 408.

At block S466, ejector pump 408 drives flow of bleed air flow 210, and in some embodiments increases a flow rate of bleed air flow 210, through bleed pipe 202 that is in fluid communication with bypass duct 24. In some embodiments, ejector pump 408 is disposed upstream a heat exchanger, such as pre-cooler 206, and thus a location of driving bleed air flow 210 is upstream a heat exchanger. In some embodiments, ejector pump 408 is disposed downstream a heat exchanger, such as pre-cooler 206, and thus a location of driving bleed air flow 210 is downstream a heat exchanger.

At block S468, pre-cooler pressurized air flow 201A' is drawn from engine core 20 for cooling by a heat exchanger such as pre-cooler 206, at a heat transfer location to transfer heat between pre-cooler pressurized air flow 201A' and bleed air flow 210, and for delivery of cooled pressurized air flow 201B, for example, to ECS 40 of the aircraft, or other suitable aircraft air system.

In some embodiments, pre-cooler pressurized air flow 201A' and auxiliary pressurized air flow 201A" are both portions of pressurized air flow 201A, and are both drawn from a same location of engine core 20.

It should be understood that one or more of the blocks may be performed in a different sequence or in an interleaved or iterative manner.

Figure 5A:
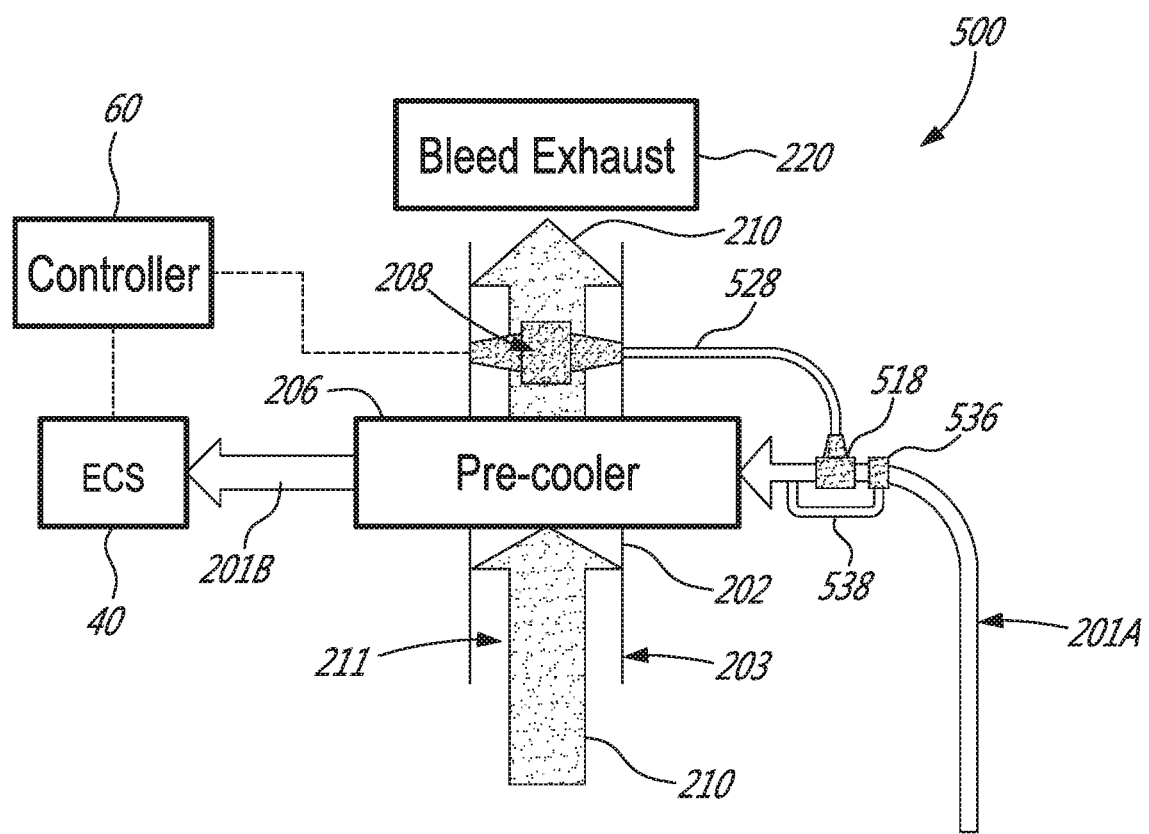
FIG. 5A is a schematic of a fluid conditioning system having a mechanically-driven auxiliary compressor, in accordance with an embodiment.

FIG. 5A is a schematic of a fluid conditioning system 500 having auxiliary compressor 208, in accordance with an embodiment. Fluid conditioning system 500 may be part of a gas turbine engine system that also includes engine 10 (not shown in FIG. 5A).

Fluid conditioning system 500 includes some of the same structure and components as the architecture of fluid conditioning system 200, including bleed pipe 202 having inlet end 203 and defining bleed fluid path 211 through which bleed air flow 210 flows and is exhausted to bleed exhaust 220, auxiliary compressor 208, as well as pre-cooler 206, as described herein.

Fluid conditioning system 500 is operable, among other things, to condition a fluid such as pressurized air flow 201A drawn from engine core 20 for cooling by a heat exchanger such as pre-cooler 206 using bleed air flow 210 bled from bypass duct 24, and forming cooled pressurized air flow 201B for use in aircraft air systems, such as an environment control system (ECS) 40, an anti-ice system or secondary air systems of engine 10.

Fluid conditioning system 500 includes a mechanically-driven embodiment of auxiliary compressor 208 that is drivingly coupled to a driveshaft 528, described in further detail below.

Fluid conditioning system 500 includes an air pathway or conduit establishing fluid communication between engine core 20 and pre-cooler 206 for directing pressurized air flow 201A drawn from engine core 20 to pre-cooler 206.

In some embodiments, pressurized air flow 201A is drawn from a location downstream a low pressure compressor, such as LPC 15A, of engine core 20. In some embodiments, pressurized air flow 201A is drawn from a location downstream a high pressure compressor, such as HPC 15B, of the engine core.

In an example, pressurized air flow 201A may be drawn from HPC 15B of compressor section 14, such as compressor discharge air pressure (P3). In some embodiments, pressurized air flow 201A may be drawn from other suitable sections of compressor section 14 or other parts of engine core 20, such as between LPC 15A and HPC 15B.

Pressurized air flow 201A may be a relatively high pressure flow, and higher pressure than bleed air flow 210 within bleed pipe 202.

In some embodiments, a turbine 518 is operatively disposed inline with pressurized air flow 201A to drive driveshaft 528 that is drivingly coupled to rotate auxiliary compressor 208, in particular, a fan or turbine of auxiliary compressor 208, to generate movement of air flow through bleed fluid path 211, increasing flow rate of bleed air flow 210 through pre-cooler 206.

Conveniently, as pressurized air flow 201A passes through turbine 518, and turbine 518 extracts energy from pressurized air flow 201A, the temperature of pressurized air flow 201A exhausted from turbine 518 may drop. Thus, a lower temperature flow is introduced to pre-cooler 206, thus may require pre-cooler 206 to do less work to cool pressurized air flow 201A to form cooled pressurized air flow 201B.

In some embodiments, a diverter valve 536 may be disposed upstream of turbine 518 on pressurized air flow 201A line to modulate the flow of pressurized air flow 201A and to divert pressurized air flow 201A around turbine 518 and thus allow turbine 518 to be turned on or off as desired.

Diverter valve 536 may be a ball valve, or other suitable valve.

FIG. 5A illustrates fluid conditioning system 500 having auxiliary compressor 208 operatively disposed downstream of pre-cooler 206, in accordance with an embodiment. In some embodiments, auxiliary compressor 208 may be disposed upstream of pre-cooler 206.

Conveniently, auxiliary compressor 208 disposed downstream of pre-cooler 206 may have the benefit of not further raising the temperature of bleed air flow 210 prior to entry into pre-cooler 206 for cooling pressurized air flow 201A.

FIG. 5B is a flow diagram of an example method 560 for conditioning a fluid, such as pressurized air flow 201A, using bleed air flow 210 augmented by a mechanically-driven configuration of auxiliary compressor 208, in accordance with an embodiment. The blocks are provided for illustrative purposes. Variations of the blocks, omission or substitution of various blocks, or additional blocks may be considered. Method 560 may be performed using various components of a gas turbine engine system, including fluid conditioning system 500 and auxiliary compressor 208, as described herein.

At block S562, bypass air flow 32 is generated in bypass duct 24 by fan 12 that is drivingly coupled to engine core 20 of engine 10.

At block S564, pressurized air flow 201A is drawn from engine core 20 to drive turbine 518 which in turn drives driveshaft 528. Driveshaft 528 in turn drives auxiliary compressor 208.

In some embodiments, diverter valve 536 selectively diverts pressurized air flow 201A around turbine 518.

At block S566, pressurized air flow 201A, for example, exhausted from turbine 518, is directed to a heat exchanger such as pre-cooler 206 for cooling, at a heat transfer location to transfer heat between pressurized air flow 201A and bleed air flow 210, and for delivery of cooled pressurized air flow 201B, for example, to ECS 40 of the aircraft, or other suitable aircraft air system.

At block S568, auxiliary compressor 208 drives flow of bleed air flow 210, and in some embodiments increases a flow rate of bleed air flow 210, through bleed pipe 202 that is in fluid communication with bypass duct 24. In some embodiments, auxiliary compressor 208 is disposed upstream a heat exchanger, such as pre-cooler 206, and thus a location of driving bleed air flow 210 is upstream a heat exchanger. In some embodiments, auxiliary compressor 208 is disposed downstream a heat exchanger, such as pre-cooler 206, and thus a location of driving bleed air flow 210 is downstream a heat exchanger.

It should be understood that one or more of the blocks may be performed in a different sequence or in an interleaved or iterative manner.

Figure 6A:
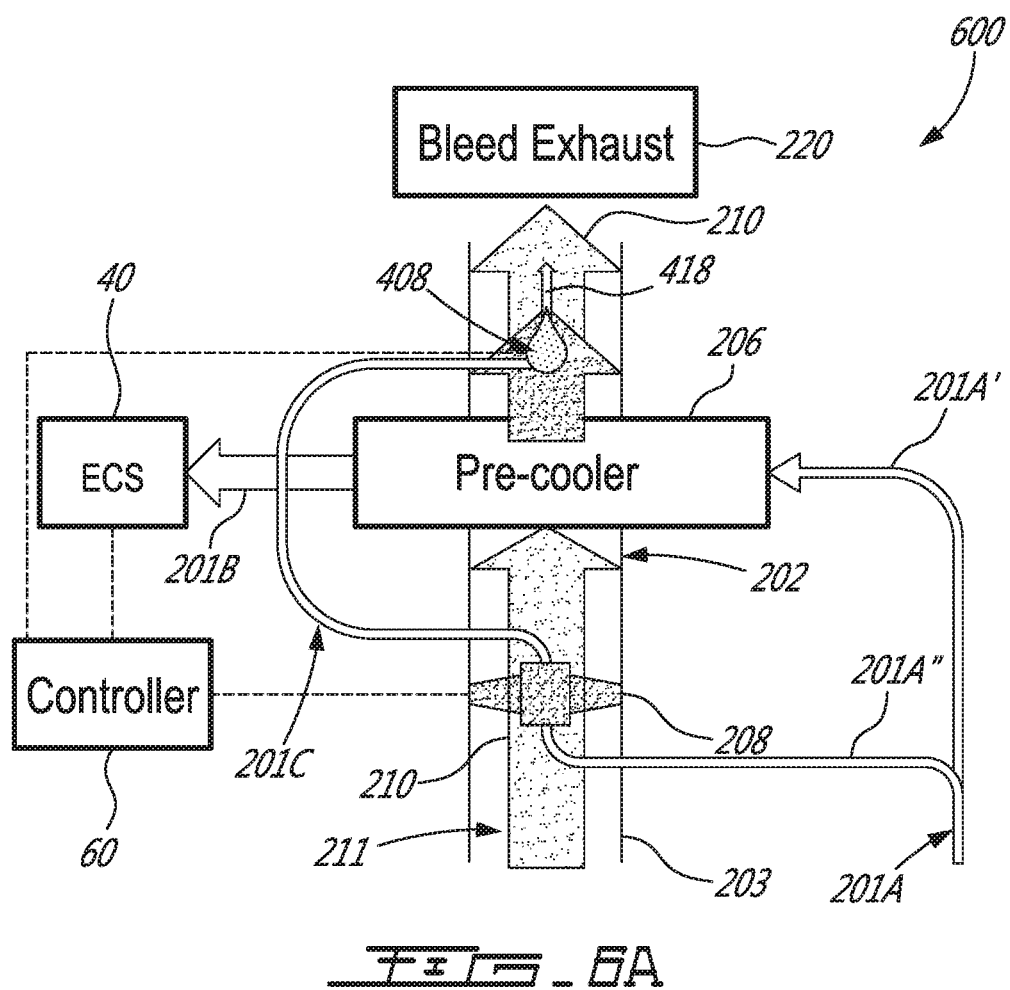
FIG. 6A is a schematic of a fluid conditioning system having an auxiliary compressor and an ejector pump, in accordance with an embodiment.

FIG. 6A is a schematic of a fluid conditioning system 600 having auxiliary compressor 208 and ejector pump 408, in accordance with an embodiment. Fluid conditioning system 600 may be part of a gas turbine engine system that also includes engine 10 (not shown in FIG. 6A).

Fluid conditioning system 600 includes some of the same structure and components as the architecture of fluid conditioning system 200 and fluid conditioning system 400, including bleed pipe 202 having inlet end 203 and defining bleed fluid path 211 through which bleed air flow 210 flows and is exhausted to bleed exhaust 220, auxiliary compressor 208, ejector pump 408, as well as pre-cooler 206, as described herein.

Fluid conditioning system 600 is operable, among other things, to condition a fluid such as pre-cooler pressurized air flow 201A' drawn from engine core 20 for cooling by a heat exchanger such as pre-cooler 206 using bleed air flow 210 bled from bypass duct 24, and forming cooled pressurized air flow 201B for use in aircraft air systems, such as an environment control system (ECS) 40, an anti-ice system or secondary air systems of engine 10.

Fluid conditioning system 600 includes an air pathway or conduit establishing fluid communication between engine core 20 and pre-cooler 206 as well as between engine core 20 and auxiliary compressor 208, for directing pressurized air flow 201A drawn from engine core 20 to pre-cooler 206 and auxiliary compressor 208.

In some embodiments, fluid communication between engine core 20 and auxiliary compressor 208 is established by an air pathway or conduit branched off from an air pathway or conduit between engine core 20 and pre-cooler 206. Thus, pressurized air flow 201A is diverted between a pre-cooler pressurized air flow 201A' to pre-cooler 206 and an auxiliary pressurized air flow 201A" to auxiliary compressor 208, and auxiliary pressurized air flow 201A" is a diverted portion of pressurized air flow 201A.

In some embodiments, pressurized air flow 201A is drawn from a location downstream a low pressure compressor, such as LPC 15A, of engine core 20. In some embodiments, pressurized air flow 201A is drawn from a location downstream a high pressure compressor, such as HPC 15B, of the engine core.

In an example, pressurized air flow 201A may be drawn from HPC 15B of compressor section 14, such as compressor discharge air pressure (P3). In some embodiments, pressurized air flow 201A may be drawn from other suitable sections of compressor section 14 or other parts of engine core 20, such as between LPC 15A and HPC 15B.

Pressurized air flow 201A may be a relatively high pressure flow, and higher pressure than bleed air flow 210 within bleed pipe 202. Similarly, pre-cooler pressurized air flow 201A' and auxiliary pressurized air flow 201A" may be relatively high pressure flows, and higher pressure than bleed air flow 210 within bleed pipe 202.

Auxiliary compressor 208 may increase flow rate of bleed air flow 210 through pre-cooler 206 by increasing the pressure gradient across pre-cooler 206, as described herein.

Auxiliary compressor 208 is driven by a pressurized air flow, in an example, auxiliary pressurized air flow 201A" from engine core 20.

In some embodiments, as illustrated in FIG. 3D, auxiliary compressor 208 is driven by auxiliary pressurized air flow 201A" directed towards internal shaft turbine 338, rotatably coupled to outer radius fan blades 328, to rotate outer radius fan blades 328, as described above, to increase the flow rate of bleed air flow 210 as a cooling flow through pre-cooler 206. Auxiliary compressor 208 of FIG. 6A may have the configuration shown in FIG. 3D.

As shown in FIG. 6A, in some embodiments, exit flow from auxiliary compressor 208 may be captured (for example, contained in an exhaust pipe) as compressor exhaust flow 201C and exhausted external to bleed air flow 210.

In some embodiments, auxiliary compressor 208 includes internal shaft turbine 338, captured compressor exhaust flow 201C may be exit flow generated by rotation of internal shaft turbine 338.

While auxiliary compressor 208 is shown in FIG. 6A as fluid-driven, in some embodiments it will be appreciated that auxiliary compressor 208 may be mechanically-driven by other means, for example, by a drive shaft such as driveshaft 528, or electrically driven, as described herein.

Fluid conditioning system 600 includes a pneumatic ejector, such as ejector pump 408, to increase pressure differential, and thus air flow rate, across pre-cooler 206.

Ejector pump 408 is driven by a higher-pressure pressurized air flow, in an example, compressor exhaust flow 201C from auxiliary compressor 208, to pump lower pressure bleed air flow 210. In some embodiments, auxiliary compressor 208 and ejector pump 408 may be operatively coupled to be driven by a common flow of pressurized air, such as pressurized air flow 201A, received from compressor section 14 of engine 10.

Ejector pump 408 generates ejector exhaust flow 418 from auxiliary pressurized air flow 201A" that exhausts to bleed pipe 202.

In the embodiment illustrated in FIG. 6A, auxiliary compressor 208 is disposed upstream of pre-cooler 206 and ejector pump 408 is disposed downstream of pre-cooler 206. Other configurations are also contemplated. In some embodiments, ejector pump 408 may be disposed upstream of pre-cooler 206 and auxiliary compressor 208 disposed downstream of pre-cooler 206. It will be appreciated that in some embodiments, both auxiliary compressor 208 and ejector pump 408 may be disposed upstream of pre-cooler 206 and in some embodiments, both auxiliary compressor 208 and ejector pump 408 may be disposed downstream of pre-cooler 206.

Thus, a location of driving bleed air flow 210 may be upstream a heat exchanger, such as pre-cooler 206, downstream a heat exchanger, or both.

Conveniently, one or both of auxiliary compressor 208 and ejector pump 408 disposed downstream of pre-cooler 206 may have the benefit of not further raising the temperature of bleed air flow 210 prior to passing through pre-cooler 206 for cooling pre-cooler pressurized air flow 201A'.

Auxiliary compressor 208 and ejector pump 408 each disposed on opposing stream-sides (upstream and downstream) of pre-cooler 206 may allow for both a push and a pull effect to be applied to bleed air flow 210, the cooling flow for pre-cooler 206, and may further augment the cooling flow rate should the available flow or pressure from bleed air flow 210 be too low, for example, if either auxiliary compressor 208 or ejector pump 408 alone would not be sufficient to augment the cooling flow of bleed air flow 210.

FIG. 6B is a flow diagram of an example method 660 for conditioning a fluid, such as pre-cooler pressurized air flow 201A', using bleed air flow 210 augmented by auxiliary compressor 208 and ejector pump 408, in accordance with an embodiment. The blocks are provided for illustrative purposes. Variations of the blocks, omission or substitution of various blocks, or additional blocks may be considered. Method 660 may be performed using various components of a gas turbine engine system, including fluid conditioning system 600, auxiliary compressor 208 and ejector pump 408, as described herein.

At block S661, bypass air flow 32 is generated in bypass duct 24 by fan 12 that is drivingly coupled to engine core 20 of engine 10.

At block S662, auxiliary pressurized air flow 201A" is drawn from engine core 20 to drive auxiliary compressor 208.

At block S663, auxiliary compressor 208 drives flow of bleed air flow 210, and in some embodiments increases a flow rate of bleed air flow 210, through bleed pipe 202 that is in fluid communication with bypass duct 24. In some embodiments, auxiliary compressor 208 is upstream a heat exchanger, such as pre-cooler 206 that is in contact with bleed air flow 210 which operates as a cooling flow for pre-cooler 206. In some embodiments, auxiliary compressor 208 is downstream a heat exchanger, such as pre-cooler 206.

At block S664, compressor exhaust flow 201C is directed from auxiliary compressor 208 to drive ejector pump 408.

At block S665, ejector pump 408 drives flow of bleed air flow 210, and in some embodiments increases a flow rate of bleed air flow 210, through bleed pipe 202 that is in fluid communication with bypass duct 24. In some embodiments, ejector pump 408 is upstream a heat exchanger, such as pre-cooler 206 that is in contact with bleed air flow 210 which operates as a cooling flow for pre-cooler 206. In some embodiments, ejector pump 408 is downstream a heat exchanger, such as pre-cooler 206.

At block S666, pre-cooler pressurized air flow 201A' is drawn from engine core 20 for cooling by a heat exchanger such as pre-cooler 206, at a heat transfer location to transfer heat between pre-cooler pressurized air flow 201A' and bleed air flow 210, and for delivery of cooled pressurized air flow 201B, for example, to ECS 40 of the aircraft, or other suitable aircraft air system.

In some embodiments, pre-cooler pressurized air flow 201A' and auxiliary pressurized air flow 201A" are both portions of pressurized air flow 201A, and are both drawn from a same location of engine core 20.

It should be understood that one or more of the blocks may be performed in a different sequence or in an interleaved or iterative manner.

In some embodiments, fluid conditioning system 200, fluid conditioning system 300, fluid conditioning system 400, fluid conditioning system 500, and fluid conditioning system 600 may each include a controller 60 in communication with an aircraft air system, such as ECS 40, and operatively coupled to a fluid propeller, such as auxiliary compressor 208 and/or ejector pump 408, and configured to selectively activate the fluid propeller when an activation condition is met. Such activation conditions may occur when additional cooling air flow is needed for pre-cooler 206, for example, a high air demand operating condition of an aircraft air system such as ECS 40. A high air demand operating condition may occur, in an example, with the engine operating at a relatively low power with high demands of an anti-ice system while cruising at 15,000-20,000 feet in a holding condition. Similarly, a fluid propeller, such as auxiliary compressor 208 and/or ejector pump 408, may be selectively deactivated at a low demand operating condition. Pressure/flow augmentation provided by an auxiliary compressor and/or ejector pump can be based on a demand by ECS 40 and/or an altitude of the aircraft (e.g., as reflected by a pressure inside of bypass duct 24) which could be controlled by controller 60 according to a suitable schedule.

It should be understood that various components of fluid conditioning system 200, fluid conditioning system 300, fluid conditioning system 400, fluid conditioning system 500, and fluid conditioning system 600 may be used interchangeably in each system.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A system for conditioning a fluid using a flow of bleed air from a bypass duct of a turbofan engine, the system comprising:
a bleed pipe connected to receive the flow of bleed air from the bypass duct via an inlet end of the bleed pipe and an opening in a wall of the bypass duct;
a passage for conveying the fluid, wherein the fluid is pressurized air received from a compressor section of a core of the turbofan engine;
a heat exchanger configured to facilitate heat transfer between the flow of bleed air from the bleed pipe and the pressurized air from the passage;
a fluid propeller driving the bleed air through the heat exchanger, the fluid propeller being driven by a portion of the pressurized air branched off from the passage to a drive pipe, the drive pipe being positioned to deliver the portion of pressurized air to radially outer portions of blades of a bladed rotor of the fluid propeller; and
a controller operatively coupled to the fluid propeller and configured to selectively activate the fluid propeller at a high demand operating condition and deactivate the fluid propeller at a low demand operating condition.

2. The system of claim 1, wherein:
the fluid propeller is a first fluid propeller disposed downstream of the heat exchanger; and
the system comprises a second fluid propeller configured to drive the bleed air through the heat exchanger, the second fluid propeller disposed upstream of the heat exchanger.

3. The system of claim 1, wherein the fluid propeller is disposed downstream of the heat exchanger.

4. The system of claim 1, wherein the fluid propeller is disposed upstream of the heat exchanger.

5. A system for conditioning a fluid using a flow of bleed air from a bypass duct of a turbofan engine, the system comprising:
a bleed pipe connected to receive the flow of bleed air from the bypass duct via an inlet end of the bleed pipe and an opening in a wall of the bypass duct;
a passage for conveying the fluid, wherein the fluid is pressurized air received from a compressor section of a core of the turbofan engine;
a heat exchanger configured to facilitate heat transfer between the flow of bleed air from the bleed pipe and the pressurized air from the passage;
a fluid propeller configured to drive the bleed air through the heat exchanger, the fluid propeller being driven by a portion of the pressurized air branched off from the passage to a drive pipe, the drive pipe being positioned to deliver the portion of pressurized air to an internal shaft turbine of the fluid propeller, the internal shaft turbine being drivingly coupled to a bladed rotor of the fluid propeller; and
a controller operatively coupled to the fluid propeller and configured to selectively activate the fluid propeller at a high demand operating condition and deactivate the fluid propeller at a low demand operating condition.

6. The system of claim 5, wherein the internal shaft turbine is disposed inside a hub of the bladed rotor.

7. The system of claim 5, wherein:
the fluid propeller is a first fluid propeller disposed downstream of the heat exchanger; and
the system comprises a second fluid propeller configured to drive the bleed air through the heat exchanger, the second fluid propeller disposed upstream of the heat exchanger.

8. The system of claim 5, wherein the fluid propeller is disposed downstream of the heat exchanger.

9. The system of claim 5, wherein the fluid propeller is disposed upstream of the heat exchanger.

* * * * *